United States Patent
Scheid

(10) Patent No.: US 7,550,105 B2
(45) Date of Patent: Jun. 23, 2009

(54) APPARATUS AND METHOD FOR STRENGTHENING BLOW MOLDED ARTICLES

(75) Inventor: Timothy E. Scheid, Grand Rapids, MI (US)

(73) Assignee: Access Business Group International LLC, Ada, MI (US)

( * ) Notice: Subject to any disclaimer, the term of this patent is extended or adjusted under 35 U.S.C. 154(b) by 815 days.

(21) Appl. No.: 11/063,655

(22) Filed: Feb. 23, 2005

(65) Prior Publication Data
US 2006/0186582 A1    Aug. 24, 2006

(51) Int. Cl.
*B29C 49/64* (2006.01)
(52) U.S. Cl. .................................. 264/520; 425/526
(58) Field of Classification Search ............ 264/520; 425/526, 534; 239/455
See application file for complete search history.

(56) References Cited

U.S. PATENT DOCUMENTS

| | | | |
|---|---|---|---|
| 768,095 A * | 8/1904 | Twist ......................... 239/455 |
| 3,114,596 A | 12/1963 | Wechsler et al. |
| 3,294,883 A | 12/1966 | Polka |
| 3,592,886 A | 7/1971 | Havely |
| 3,632,713 A | 1/1972 | Seefluth |
| 4,049,760 A | 9/1977 | Lozach |
| 4,151,249 A * | 4/1979 | Lee .......................... 264/520 |
| 4,206,171 A | 6/1980 | Uhlig |
| 4,221,759 A | 9/1980 | Hubert et al. |
| 4,435,146 A * | 3/1984 | Wiatt et al. ................ 425/534 |
| 4,592,720 A * | 6/1986 | Dugan et al. ............... 425/526 |
| 5,178,816 A | 1/1993 | Suzuki et al. |
| 5,229,142 A | 7/1993 | Yokobayashi |
| 5,290,506 A | 3/1994 | Yokobayashi |
| 5,604,267 A * | 2/1997 | Duffy ........................ 521/133 |
| 5,869,110 A | 2/1999 | Ogihara |
| 5,980,808 A | 11/1999 | Imaizumi |
| 6,332,770 B1 | 12/2001 | Oueslati et al. |
| 6,372,318 B1 | 4/2002 | Collette et al. |
| 6,444,159 B2 | 9/2002 | Petre |
| 6,554,602 B2 | 4/2003 | Deemer et al. |
| 6,558,598 B2 | 5/2003 | Neter et al. |
| 2001/0051192 A1 | 12/2001 | Petre |
| 2003/0057598 A1 | 3/2003 | Brand et al. |

FOREIGN PATENT DOCUMENTS

JP    58-187318 A    11/1983

\* cited by examiner

*Primary Examiner*—Robert B Davis
(74) *Attorney, Agent, or Firm*—Warner Norcross & Judd LLP

(57) ABSTRACT

A method and apparatus are provided for strengthening a portion of a blow molded bottle. The method includes directing a jet of cooled air at a preform before it is molded, causing the wall thickness in the cooled area to remain thicker after molding to strengthen that area of the blow molded article. The apparatus includes a blow molding machine that is provided with a nozzle positioned to direct the cooled jet of air towards the preform. The nozzle is mounted in a standby station that is in between the existing heating station and blow molding station. In one embodiment, the cooled jet of air is directed at a location just below the neck of the preform to create a ring of increased thickness in the shoulder of the blow molded bottle, adding strength to the shoulder of the bottle. A conventional blow molding machine may be modified to rotate and cool the preform in the standby station.

20 Claims, 7 Drawing Sheets

APPARATUS AND METHOD FOR STRENGTHENING BLOW MOLDED ARTICLES

BACKGROUND OF THE INVENTION

The present invention relates to blow molding, and more particularly to an apparatus and method for strengthening a portion of a blow molded article.

Blow molding is a common process for forming articles such as plastic bottles. This process typically begins with forming a preform by injection molding. Preforms are usually shaped like a test tube, with the open end having a neck similar to the neck of a molded plastic bottle. After the preforms are formed, they are placed in a blow molding machine, usually by attaching the neck of each preform to a carrier for transport through the machine. The preforms are then transported through a heating station, where they are heated by a number of heaters, and then transported into a blow molding station. In the molding station, the preforms are inserted into a mold cavity and then blown and stretched into the shape of the mold cavity. The molded articles are then cooled, removed from the machine and distributed for use.

To ensure that heat from the heaters is distributed evenly to each of the preforms, blow molding machines often rotate the preforms as they pass through the heating station. Rotation may be provided by a number of conventional methods, such as a belt that is driven by pulleys and contacts each preform carrier.

One common problem that arises with blow molded articles, especially plastic bottles, is that they often dent or crumple during packaging, shipping, or use. Often this damage is due to improper handling of the bottle. In many cases, the damage could be prevented if the bottles were stronger. To address this problem, some manufacturers have attempted to add strength to blow molded bottles during the blow molding process. One attempted solution is to mold ribs or other features into the walls of the bottle to add rigidity to those areas of the bottle. This method is effective at strengthening the bottle, but the ribs are often unsightly and therefore unsuitable for many applications. Another attempted solution is to increase the thickness of the entire bottle. This too is effective at strengthening the bottle, but it requires much more material per bottle. When factored over the thousands of bottles that are often made for a given application, the increased material costs from these methods can drive the price of these bottles out of the targeted market.

SUMMARY OF THE INVENTION

The present invention is directed to a system and method for strengthening a blow molded article that is formed from a preform. The article is formed in a blow molding machine that includes a heating station and a blow molding station. The method includes the steps of: a) transporting the preform in a carrier along a path through the heating station and the blow molding station; b) heating the preform in the heating station; c) providing an air nozzle between the heating station and the blow molding station adjacent to the path of the preform and fixed in position with respect to the path; d) rotating the preform as it is transported past the nozzle; d) directing a jet of air through the nozzle towards the preform, the jet of air being cooler than the preform to form a process ring on a selected portion of the preform; and e) molding the preform in the blow molding station, the process ring forming a strengthened region in the article. In another embodiment, the blow molded article is a bottle, and the particular location may be just below the neck of the preform, such that the shoulder region of the bottle is strengthened.

In another aspect, the present invention provides a method for modifying a conventional blow molding machine to strengthen articles formed from preforms. The blow molding machine includes a heating station and a blow molding station, a transport system for transporting the preforms from the heating station to the blow molding station, and a rotation mechanism for rotating the preforms. The method comprises the steps of a) extending the rotation mechanism into a standby station located between the heating station and the blow molding station to rotate the preforms in the standby station; b) positioning a nozzle adjacent to the standby station, the nozzle subjecting the preforms to a jet of air in the standby station; and c) molding the preforms into blow molded articles in the blow molding station after the preforms are subjected to the jet of air. In one embodiment, the rotation mechanism may be a belt drive system, wherein the belt is extended into the standby station. Many conventional machines with belt drive rotation can be easily modified to provide this rotation by locating head and tail pulleys on opposite sides of the heating station and standby station. The belt can therefore contact the carriers as they pass through both the heating station and the standby station.

In another aspect, the present invention provides a blow molding machine for forming a blow molded bottle with strengthened portions. The apparatus includes a nozzle that provides a cooled jet of air. The nozzle is positioned to direct the cooled jet of air towards the preform. The nozzle may be mounted to the machine in a standby station that is in between an existing heating station and the blow molding station. The machine rotates the preforms in front of the nozzle to form a process ring around the preform in the area cooled by the jet of air.

The present invention provides a method for forming a stronger blow molded bottle without the cost of increasing the thickness of the entire bottle, and without unsightly ribs or other features molded into the bottle. The apparatus is easily adaptable from a conventional blow molding machine, allowing the present invention to be easily and cost effectively implemented.

These and other objects, advantages, and features of the invention will be more fully understood and appreciated by reference to the detailed description of the current embodiment and the drawings.

DETAILED DESCRIPTION OF THE CURRENT EMBODIMENT

I. Overview

Figure 1:
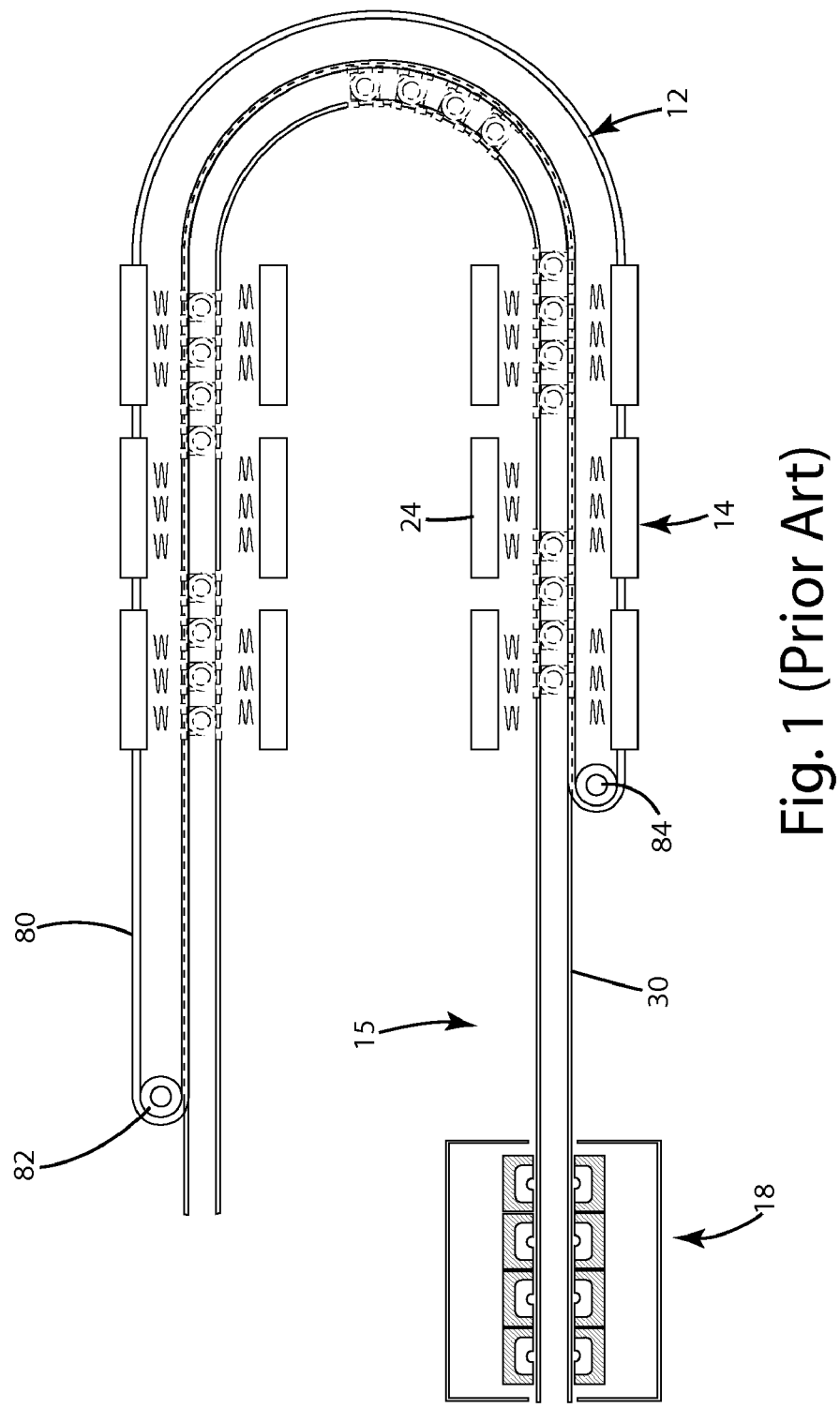
FIG. 1 is a top view of a prior art blow molding apparatus.

For purposes of illustration, the present invention will be described in connection with an SF Blow Molding System, manufactured by SIPA of Vittorio Veneto, Italy. A top plan view of the SF blowing system is shown in FIG. 1. The present invention is well suited to be adapted for use with the SF blowing system; however, the invention is also readily adapted for use in other blow molding machines. In general, the blow molding apparatus includes a transport system 12, a heating station 14, a standby station 16, and a blow molding station 18. The transport system 12 includes a plurality of carriers 22 for holding and rotating the preforms 20, track 31, belt 80, and plurality of pulleys 82, 84. The heating station 14 includes a plurality of heaters 24 that receive and heat the preforms 20. The standby station 16 is between the heating station 14 and the blow molding station 18, and may provide time for the temperature of the preforms to equalize before they pass into the blow molding station 18. The blow molding station 18 includes a plurality of molds 28 for forming blow molded articles. According to the prior art, preforms are releasably attached to carriers 22 and transported through heating station 14, standby station 15, and then into blow molding station 18 by belt 80 along track 31.

Figure 2:
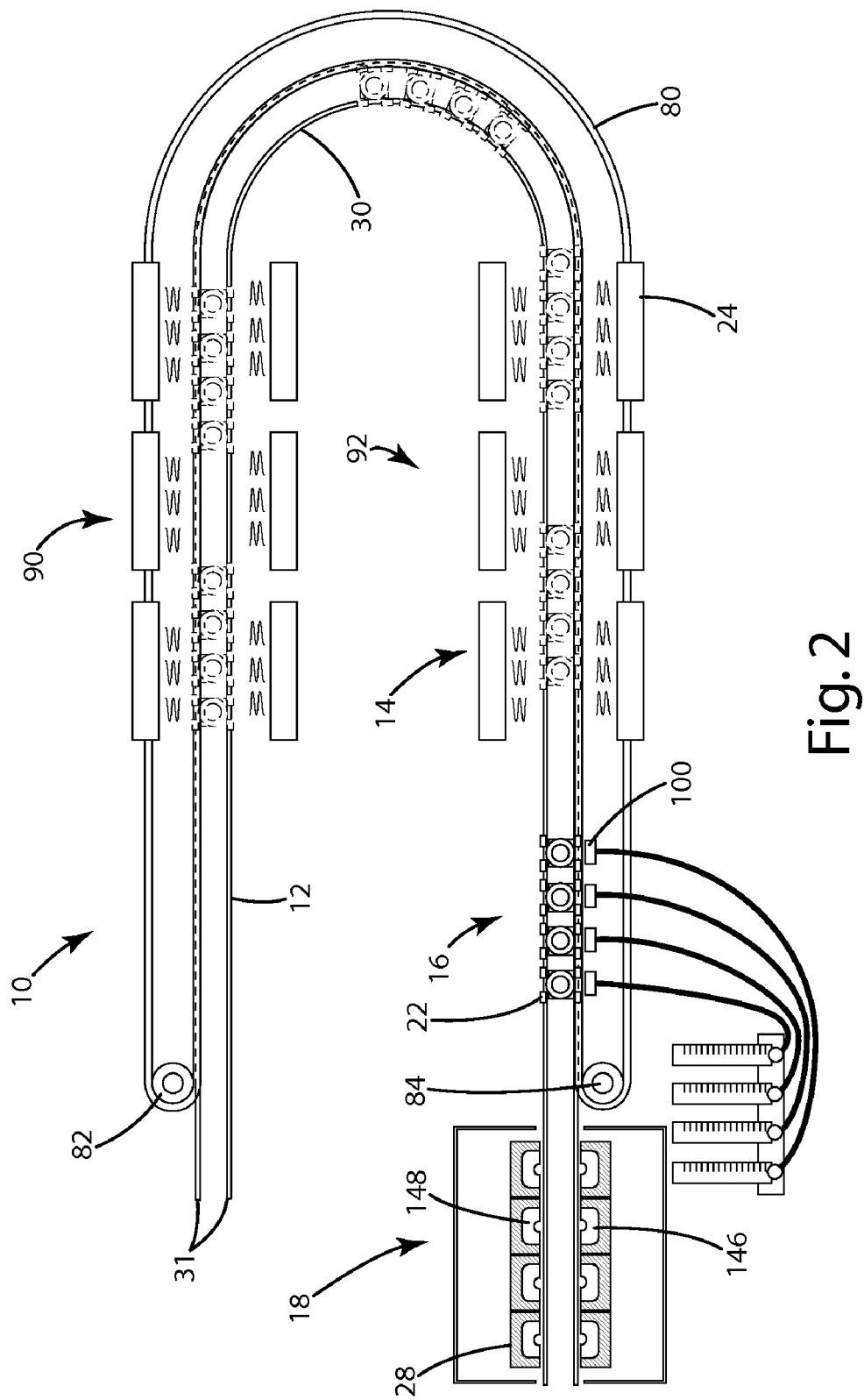
FIG. 2 is a top view of a blow molding apparatus according to one embodiment of the present invention.

A blow molding apparatus according to one embodiment of the present invention is shown in FIG. 2 and generally designated 10. Standby station 16 is comprised of a plurality of nozzles 100 coupled with an air supply 104 as described in more detail below. In operation, the transport system 12 carries plastic preforms 20 through each of the stations. The preforms 20 are held and rotated by the carriers 22 as they are transported. The preforms 20 are heated by heaters 24 in the heating station 14. Preforms 20 are then transported by transport system 12 to standby station 16, where they are subjected to a cooled jet of air from nozzles 100 as described in more detail below. Preforms are then transported by transport system 12 to blow molding station 18, where the performs are blow molded into articles. The present invention may be used connection with a conventional one-step blow molding process, wherein the preforms are placed in the blow molding machine immediately after they are formed; or with a conventional two-step blow molding process, wherein the preforms are stored for a period of time before they are placed in the blow molding machine.

As shown in FIG. 2, the heating station 14 includes one or more heaters 24. The heaters 24 are typically conventional oven platens that are disposed next to the track 30. The oven platens are capable of heating the preforms 20 to a desired temperature as the preforms 20 pass through the heating station 14. The heaters 24 may be disposed in a variety of different locations along the track 30. In the illustrated embodiment, a plurality of heaters 24 are positioned on both sides of the track 30 in a first group 90 and a second group 92. Alternatively, one or more heaters 24 may be placed only on one side of the track 30, or may be disposed continuously along the track 30.

Figure 3:
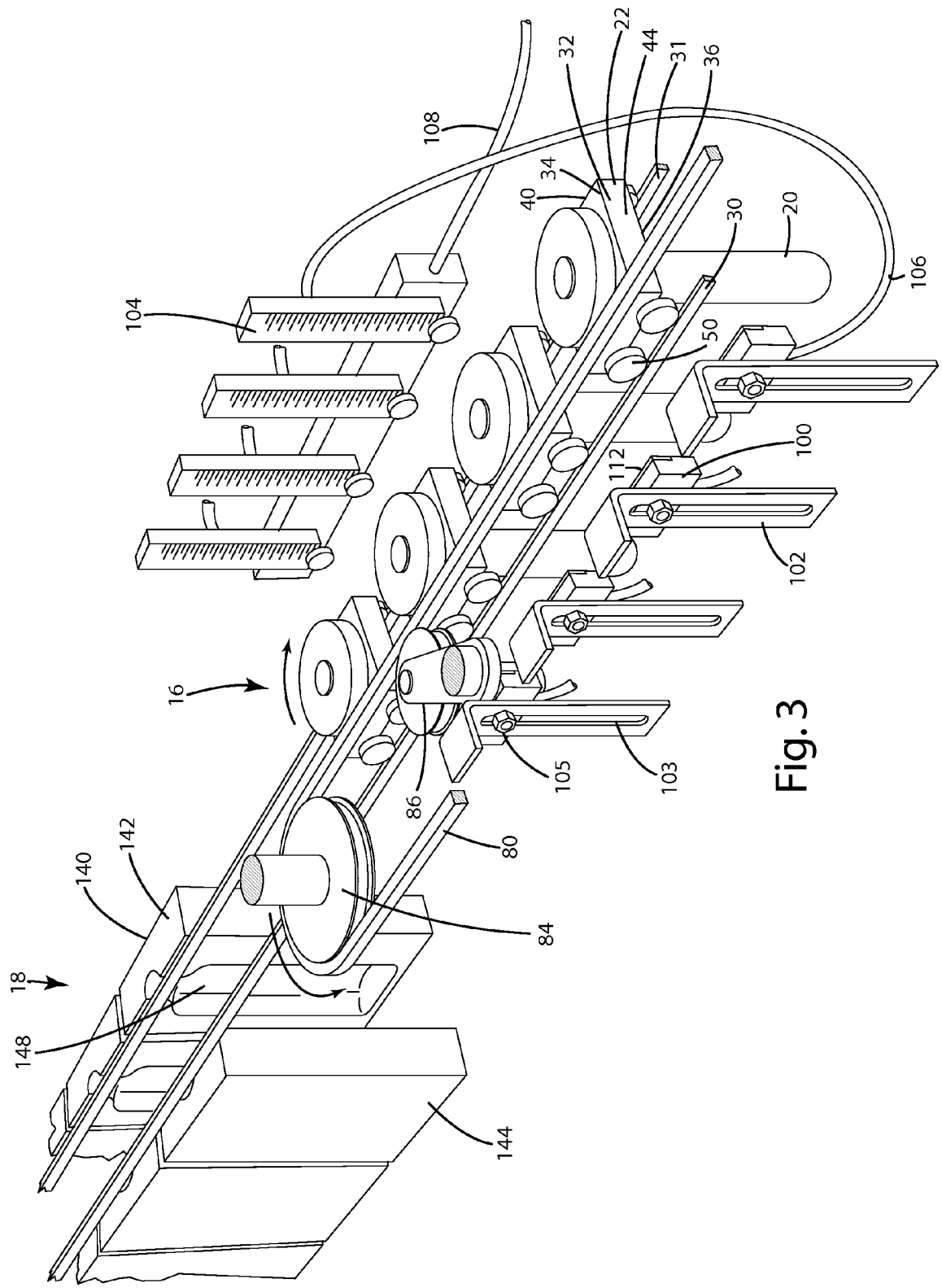
FIG. 3 is a close up view of the standby station and the molding station of the blow molding apparatus.

Referring now to FIGS. 2 and 3, the standby station 16 is typically located between the heating station 16 and the blow molding station 18. The standby station 16 includes one or more nozzles 100. According to the illustrated embodiment, standby station 16 includes four nozzles 100. The nozzles 100 are supported by brackets 102 so that each nozzle 100 may remain fixed in relation to the preforms 20 as the preforms are transported by the carriers on a path through the standby station 16. The nozzles 100 are spaced such that each nozzle 100 may align with one preform if the transportation of the preforms is paused in the standby station 16. Each bracket 102 includes a slot 103 extending approximately the length of the bracket 102. The nozzles 100 are slidably attached to the brackets 102 with fasteners 105 that extend through the slots 103 and into the nozzles 100. The nozzles 100 are each attached to a conventional flow meter 104 with a tube 106. A supply tube 108 supplies air to the flow meters 104 from a compressor (not shown). The flow meters can be adjusted to supply a desired air pressure to the nozzles 100. The temperature of the air can also be regulated. In one embodiment, the temperature of the air is approximately 40° F., although the air temperature may be adjusted to any desired temperature. In this application, the term "cooled jet of air" is intended to mean cooler than the temperature of the preforms, and includes ambient air as well as air with a regulated temperature.

Figure 4:
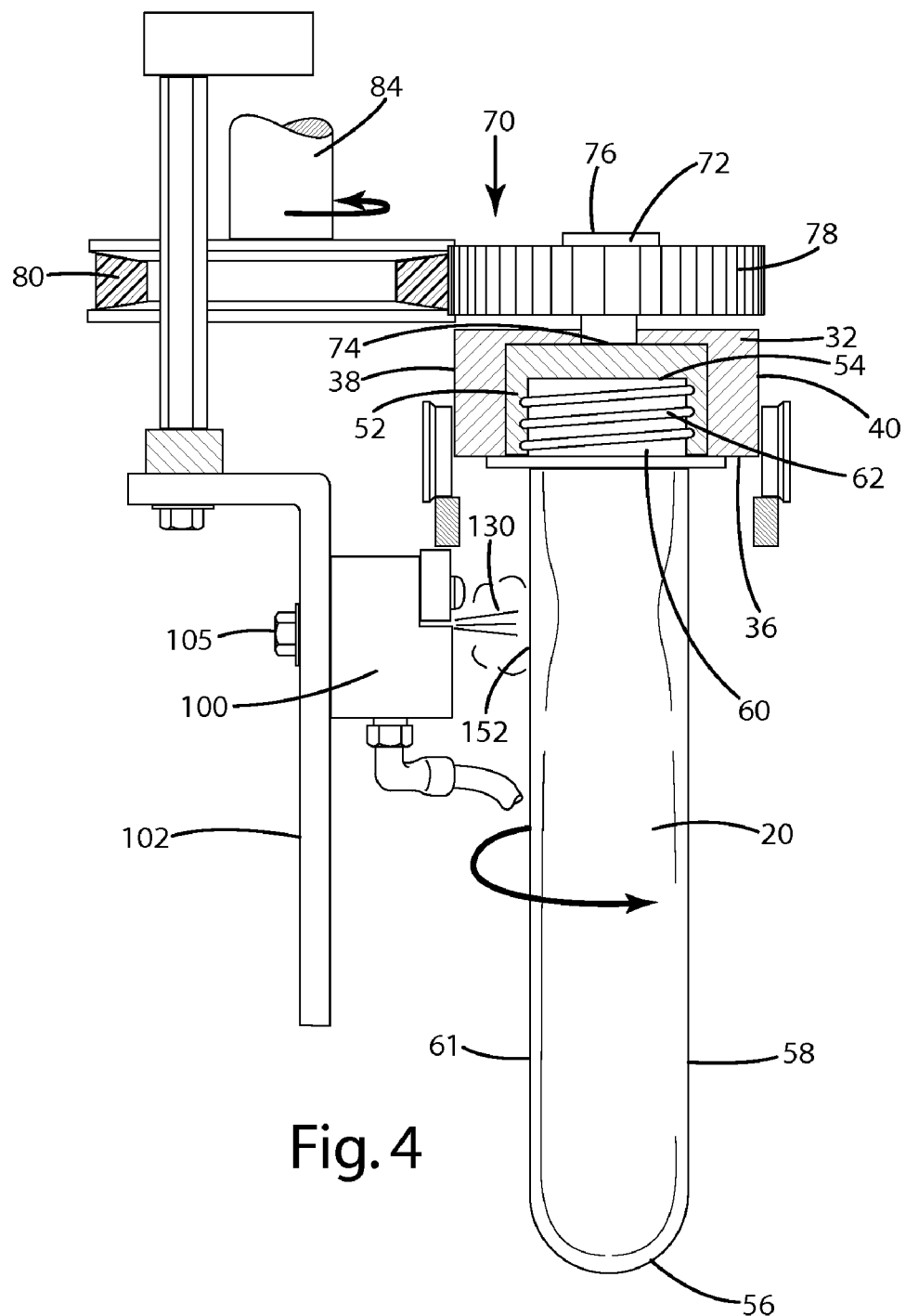
FIG. 4 is a side view of the standby station.

Referring to the figures, and in particular to FIGS. 3 and 4, the transport system 12 generally includes a plurality of carriers 22 and a track 30. In the illustrated embodiment, track 30 includes a pair of parallel rails that extend in a U-shaped pattern through each of the stations. Alternatively, the track 30 could be comprised of any number of rails and configured in any desired pattern, depending on the layout of the stations. According to the illustrated embodiment, carriers 22 each include a block 32 having an upper surface 34, a lower surface 36, first and second sides 38 and 40, a front 42, and a back 44. A plurality of wheels 50 are attached to the sides 38 and 40 for engaging the rails of track 30. Each carrier 22 includes a grip 52 located on the lower surface 36. The grip 52 grasps a preform 20 at a desired location for holding the preform in the carrier 22. According to one embodiment the grip 52 defines a recess in the lower surface 36 that grasps the neck 60 of each preform by threadedly receiving the threads 62 of a preform 20. The grip 52 may attach to a rotation system 70 for rotating the preform 20 with respect to the carrier 22. In the illustrated embodiment, the rotation system 70 includes a pin 72 attached to the grip 52. The pin 72 includes a first end 74 attached to the grip 52, and a second end 76 extending through the upper surface 34 of the block 32 and attached to a wheel 78. The wheel 78, pin 72, and grip 52 rotate with respect to the block 32, such that rotation of the wheel 78 causes rotation of the preform 20 with respect to the block 32. According to the illustrated embodiment, belt 80 engages wheel 78, causing wheel 78 to rotate with respect to block 32. The belt 80 is an elongated material that extends alongside the track 30. As illustrated, belt 80 is positioned on the outside of the track 30, but the belt 80 may otherwise be positioned on the inside of the track or above or below the track 30. Belt 80 extends around first and second (i.e. head and tail) pulleys 82 and 84. One of the pulleys 82, 84 is attached to a conventional motor (not shown) for driving the pulleys 82, 84 and the belt 80. A plurality of guide pulleys 86 contact the belt 80 to guide the belt 80 and to push the belt 80 into contact with each of the wheels 78. Referring again to FIG. 2, second pulley 84 is located proximate the blow molding station 18 and extends belt 80 alongside the track 30 into the standby station 16. Alternatively, the second pulley 84 could be located between heating station 14 and standby station 16, and an additional set of pulleys and a belt can be added in the standby station 16 or at another location where the belt may extend into the standby station, thereby providing rotation to the preforms 20 in the standby station 16. The carriers 22 may be disposed along the track 30 in discrete units, such as the discrete groups of four carriers shown in the drawings, or they may be continuously disposed along the track 30. The carriers 22 are conventionally connected to each other, and are driven along the track by a motor (not shown). The motor may continuously drive the carriers 22 along the track 30, or may move the carriers a preselected distance at preselected intervals. Although the illustrated embodiment employs a belt and pulley system for rotating the preforms, it should be noted that the present invention is also adaptable for use with other constructions, such as a chain that engages the preforms and is driven by gears.

Depending on the desired shape of the article to be molded, preforms 20 may be a variety of shapes and sizes. Referring to FIG. 4, the preforms 20 are shaped similar to a test tube, having an open end 54, a closed end 56, and a sidewall 58 extending between the open and closed ends. The sidewall 58 generally has a uniform thickness 61. The open end 56 includes a neck 60 having exterior threads 62. The preforms 20 are typically injection molded plastic such as PET (Poly Ethylene Terephthalate).

Figure 5:
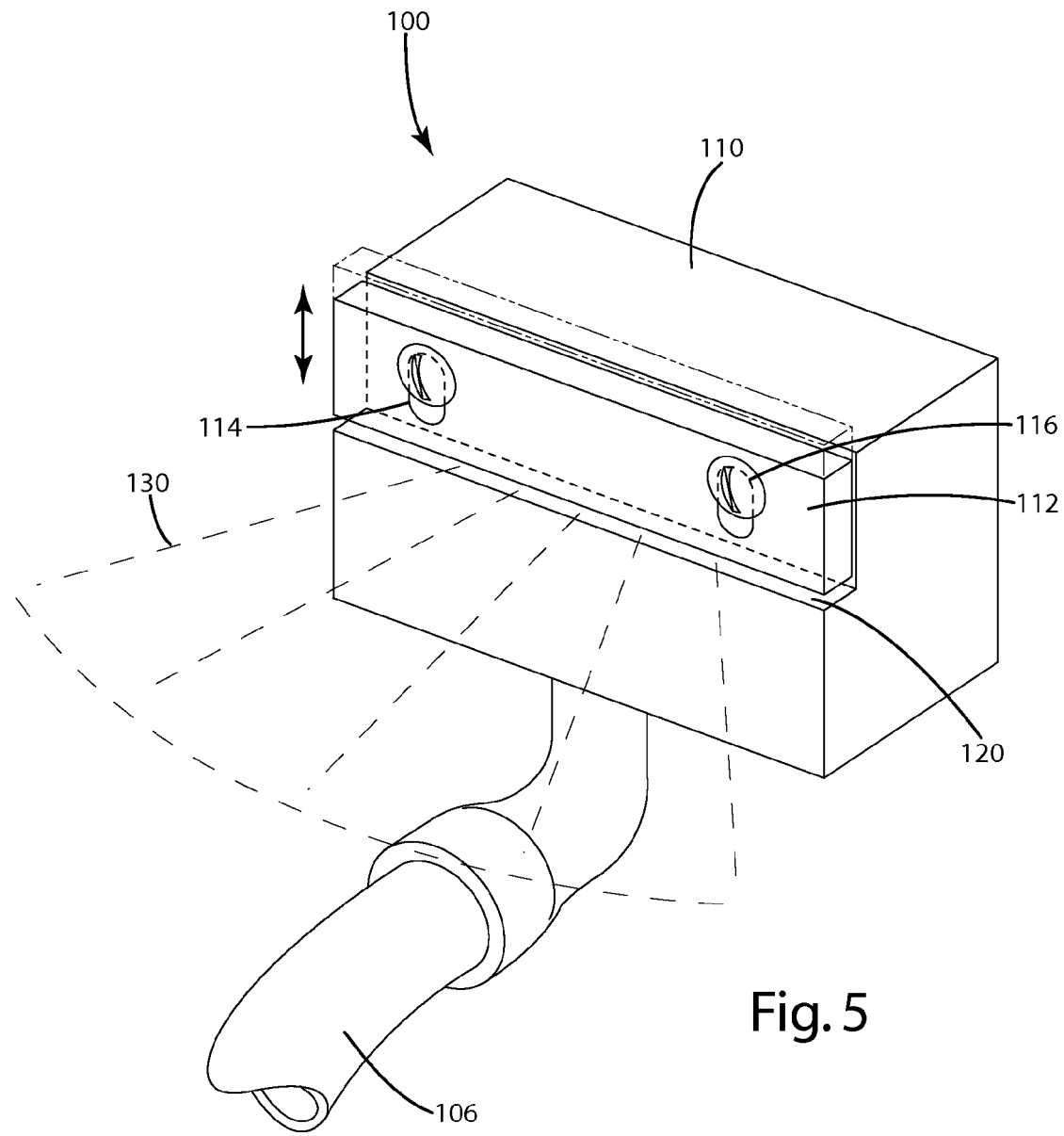
FIG. 5 is a close up view of a nozzle.

As shown in FIG. 5, each nozzle 100 includes a block 110 and a slidable plate 112 attached to the block 110. The slidable plate 112 includes a plurality of slots 114, and is attached to the block with conventional fasteners 116 that extend through the slots 114 and into the block 110. The slidable plate 112 and the block 110 cooperate to define a gap 120 therebetween. The width of the gap 120 can be adjusted by sliding the plate 112 along the slots 114. In one embodiment, the gap 120 is approximately 0.01 inches wide; however, the gap 120 may be set at a wide variety of desired widths. The air tube 106 is attached to the block 110 so that air supplied by the tube 106 passes through the block 110 and then through the gap 120 between the block 110 and the plate 112. According to one embodiment, a jet of air 130 in the form of a ribbon is created as the air passes through the gap 120. The width of the ribbon of air 130 can be controlled by adjusting the width of the gap 120. As shown in FIG. 4, the nozzles 100 are attached to the brackets 102 such that the ribbon of air 130 from each nozzle 100 is directed at a location 152 on one of the preforms 20 below the neck 60 of the preform 20. This position may be adjusted by sliding the nozzles 100 along the slots 103 in the brackets 102. Although the illustrated embodiment discloses a ribbon of air, the jet may alternatively have a variety of shapes, including a rectangular or circular cross-sectional area.

Figure 6:
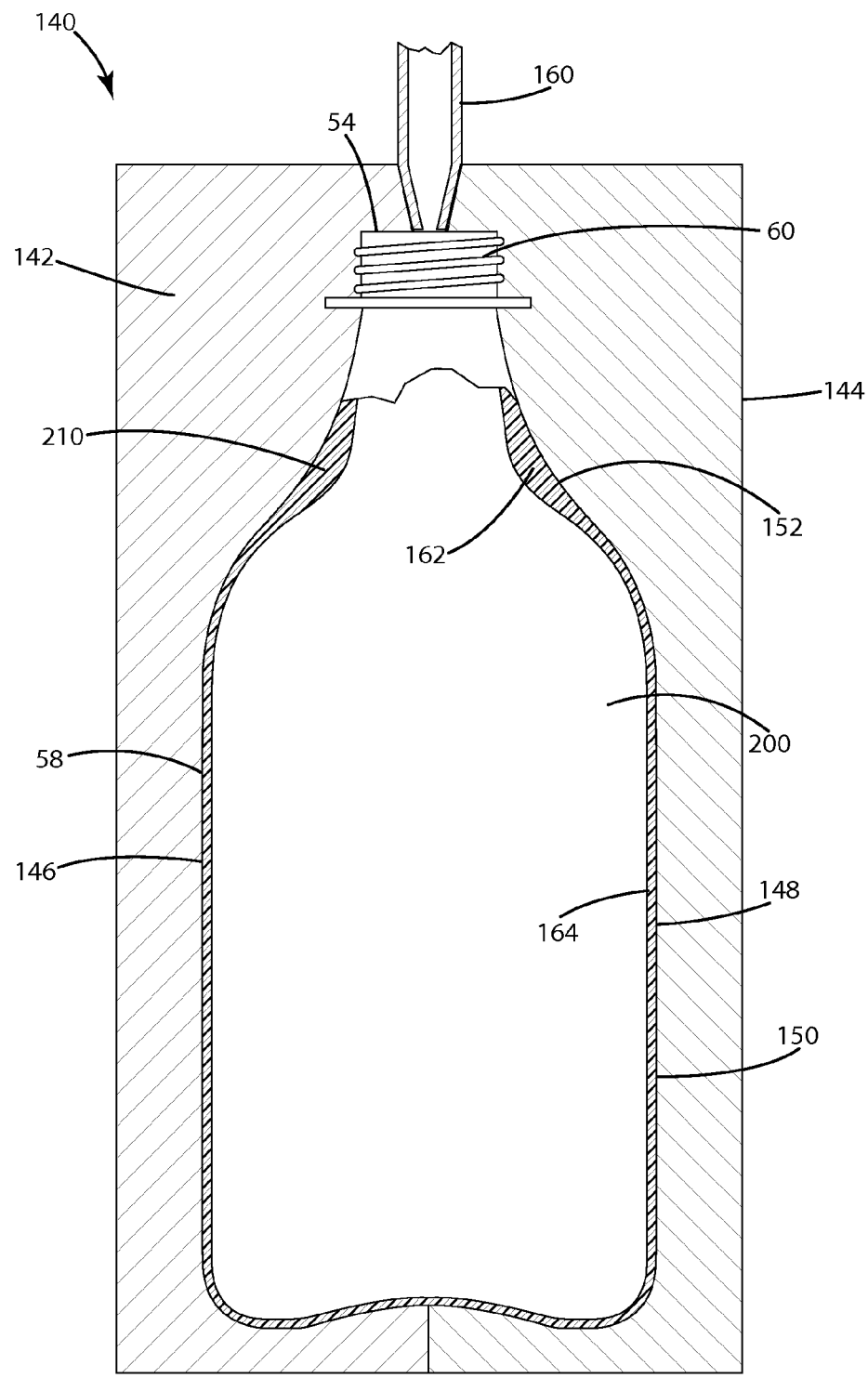
FIG. 6 is a side cross sectional view of the mold.

Referring to the figures, and in particular to FIGS. 3 and 6, blow molding station 18 includes one or more molds 140. In the illustrated embodiment, the blow molding station 18 includes four molds 140. The molds 140 each include first and second mold halves 142 and 144 that are disposed on opposite sides of the track 30. The mold halves 142 and 144 are actuatable to close together on either side of a preform 20 after the preform 20 has been transported to the blow molding station 18 and between the mold halves 142, 144. The mold halves 142, 144 each define a cavity 146, 148 that is shaped according to the desired shape of one half of the blow molded article 200. As shown in FIG. 6, when the mold halves 142, 144 are closed about a preform 20, the cavity 150 defined by the mold half cavities 146, 148 is shaped to correspond to the desired shape of the blow molded article 200. According to the illustrated embodiment, cavity 150 is shaped like a bottle. The molding station 18 further includes a high pressure air supply 160. The high pressure air supply 160 is directed through the open end 54 of the preform 20 when the preform 20 is positioned within the closed mold halves 142, 144 to direct high pressure air into the preform 20.

III. Operation

In operation, one or more preforms 20 are attached to carriers 22, for instance, by threading the neck 60 of each preform 20 into a grip 52 on one of the carriers 22. The preforms 22 are then transported along the track 30 by the carriers 22 upon activation of the motor connected to the carriers 22. As the preforms 22 are transported, they are simultaneously rotated. The rotation is provided by the engagement of the belt 80 with the wheel 78 of each carrier 22. The belt 80 is driven about the pulleys 82 and 84 by the motor connected to one of the pulleys 82, 84. The movement of the belt 80 causes the wheels 78 of each carrier 22 to rotate, and consequently causes the preforms 20 to rotate.

The preforms are first driven into the heating station 14. As the preforms pass through heating station 14, they are heated to a desired temperature by heaters 24. The preforms 20 then pass through the standby station 16. In the standby station 16, the preforms pass in front of the nozzles 100. As the preforms 20 pass in front of the nozzles 100, the nozzles 100 are stationary and a cooled ribbon of air 130 is directed at the preforms 20 at a location 152 below the neck 60 of each preform 20. The preforms 20 are rotated at least one full revolution as they pass through the standby station so that a cooled process ring is formed in the location 152 of the preform 20 receiving the ribbon of air 130.

The preforms 20 are then transported into the blow molding station 18. As the preforms move into the blow molding station 18, they travel beyond the second pulley 84 so that the carriers 22 are no longer in contact with the belt 80 and the preforms 20 are no longer in rotation. The preforms 20 are transported by the carriers 22 until each preform 20 is aligned between the mold halves 142, 144 of one of the molds 140. The mold halves 142, 144 are then actuated to close about the preform 20 aligned therebetween. During this process, the preform 20 may be released from the carrier 22. The preform 20 is then blow molded in the mold 140 by conventional blow molding techniques. In short, a high pressure air supply is directed into the open end 54 of the preform 20 and the preform 20 is blown outwardly until it fills the mold cavity 150 and forms the desired blow molded article 200. The blow molded article 200 may then be removed from the mold 140.

Figure 7:
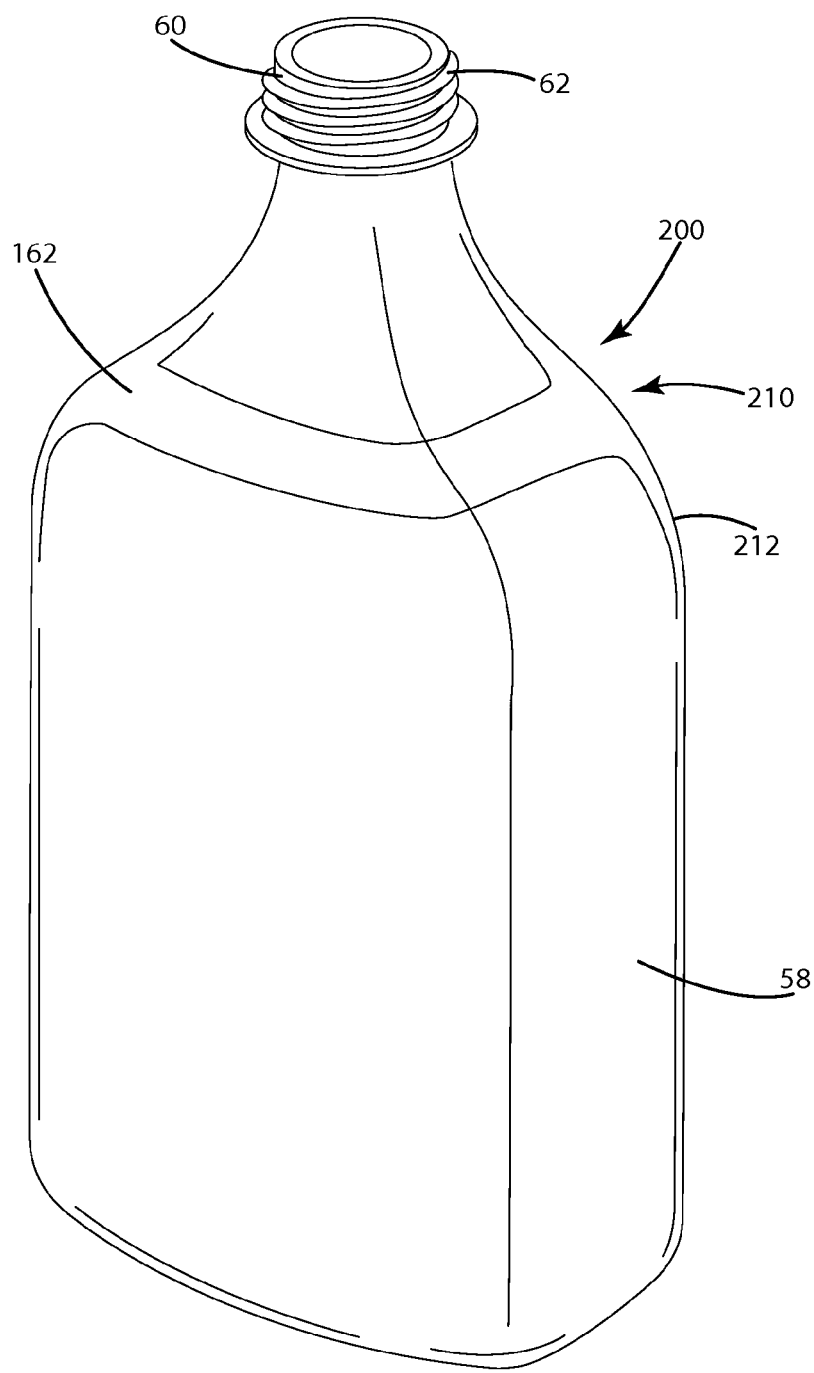
FIG. 7 is a perspective view of a blow molded bottle

Referring to FIGS. 6 and 7, the cooled process ring formed at location 152 is less malleable than the remainder of sidewall 58. As a result, section 162 of the blow molded article 200 corresponding with location 152 of perform 20 maintains a wall thickness that is greater than the thickness of the remainder of sidewall 164 of article 200. Accordingly, this location 162 is relatively stronger than the surrounding sidewall 164 after the article 200 has been formed. In the embodiment illustrated in FIG. 5, blow molded article 200 is a bottle and location 152 receiving the cooled ribbon of air 130 was below the neck 60 of the preform 20, strengthened region 162 is formed in the shoulder region 210 of the bottle 200. The shoulder region including the shoulder 212, and the section between the shoulder 212 and the neck 62. In this embodiment, the shoulder 212 is stronger than the shoulder of a bottle formed using prior art processes, without the added expense of increasing the thickness of the entire bottle. In an alternative embodiment, the thickness of a wide variety of locations may be similarly increased by adjusting the position of the nozzles 100 and the properties of the ribbon of air 130 directed at the preform 20.

The above descriptions are those of a current embodiment of the invention. Various alterations and changes can be made without departing from the spirit and broader aspects of the invention, which are to be interpreted in accordance with the principles of patent law including the Doctrine of Equivalents.

The invention claimed is:

1. An apparatus for strengthening a blow molded article, wherein the blow molded article is molded from a preform, the apparatus comprising:

a heater for heating the preform to a desired temperature;

a blow mold including a mold cavity for receiving said preform, said mold cavity defining a shape corresponding to a desired shape of the blow molded article, said blow mold capable of molding the preform into the shape of said cavity after the preform has been heated by said heater;

a transport system for moving the preform through said heater and said blow mold along a path; and a nozzle positioned to direct a cooled jet of air towards a desired location on the preform, said nozzle fixed in position along said path between said heater and said blow mold, said cooled jet of air cooling said desired location on the preform to strengthen the preform in said desired location, wherein a wall of said preform maintains a greater thickness in said desired location than in the remainder of said wall after said preform is blow molded;

wherein said nozzle is adapted to be selectively adjusted to vary the size of said cooled jet of air and to vary said desired location on said preform.

2. The apparatus of claim 1 wherein the preform includes a first end, a second end, a neck, and a shoulder region, said first end defining an opening and said second end being closed, said neck comprising a portion of the preform including said first end, said shoulder region comprising a portion of the preform proximate said neck, said cooled jet of air directed towards said shoulder region.

3. The apparatus of claim 1 further including an air flow meter, said air flow meter connected to said nozzle to adjustably control the pressure of said cooled jet of air.

4. The apparatus of claim 1 comprising a plurality of said nozzles.

5. The apparatus of claim 1 further including a carrier for transporting the preform along said path proximate said heater, said nozzle, and into said blow mold, said carrier including a grip for holding a portion of the preform, said grip being rotatable with respect to said carrier.

6. The apparatus of claim 4 further including a belt, said grip including a wheel in contact with said belt, said belt provided with motion to rotate said wheel proximate said heater and said nozzle.

7. The apparatus of claim 6 wherein said belt is driven about a first pulley and a second pulley, said pulleys located on opposite sides of said standby station, said belt providing rotation to said grips as said carrier moves past said nozzle.

8. The apparatus of claim 1 wherein said nozzle includes a first plate and a second plate, said first plate and said second plate spaced apart to form a gap therebetween for the passage of said cooled jet of air.

9. The apparatus of claim 8 wherein said gap defines a width, and wherein said first plate is slidable with respect to said second plate to control the distance of said width.

10. A method for strengthening a blow molded article, the article formed from a preform in a blow molding machine that includes a heating station and a blow molding station, the method comprising the steps of:

transporting the preform in a carper along a path through the heating station and the blow molding station;

heating the preform in the heating station;

providing an air nozzle between the heating station and the blow molding station adjacent to the path of the preform and fixed in position with respect to the path;

adjusting the size of the air nozzle to correspond to a desired location on the perform;

rotating the preform as it is transported past the nozzle;

directing a jet of air through the nozzle towards the preform, the jet of air being cooler than the preform to form a process ring on a selected portion of the preform; and molding the preform in the blow molding station, the process ring maintaining a greater thickness than the remainder of the preform and forming a strengthened and thickened region in the article.

11. The method of claim 10 wherein the process ring is formed proximate to a neck of the preform, such that the process ring thickens and strengthens a shoulder region of the article.

12. The method of claim 10 wherein the rotation of the preform includes contacting a portion of the carrier with a belt that is driven by a set of pulleys.

13. The method of claim 12 wherein two of said pulleys are located on opposite sides of the nozzle.

14. The method of claim 13 wherein the cater includes a grip that grasps the neck of the preform and rotates the preform with respect to the carrier.

15. The method of claim 14 wherein the grip is attached to a wheel that rotates with the grip and is contacted by the belt.

16. The method of claim 10 wherein the cooled jet of air has a pressure that is controlled by an air flow meter.

17. A method for modifying a blow molding machine to strengthen blow molded articles formed from preforms, the machine including a heating station, a blow molding station, a transport system for transporting the preforms from the heating station to the blow molding station, and a rotation mechanism for rotating the preforms, the method comprising the steps of:

extending the rotation mechanism into a standby station between the heating station and the blow molding station to provide rotation to the preforms in the standby station;

positioning a nozzle adjacent to the standby station;

adjusting at least one of the size and position of the nozzle to correspond to a desired location on the preforms, the nozzle subjecting the desired location on the preforms to a jet of air in the standby station to cool and strengthen the preforms in the desired location; and molding the preforms into blow molded articles in the blow molding station after the preforms are subjected to the jet of air, wherein the preforms maintain a greater thickness in the desired location than in the remaining portions of the preforms after the articles are molded.

18. The method of claim 17 wherein the rotation mechanism is a belt drive system, and wherein the step of extending the rotation mechanism into the standby station includes extending a belt into the standby station.

19. The method of claim 18 wherein the belt extends around a number of pulleys, and the step of extending the rotation mechanism includes positioning a pulley such that said belt extends into said standby station.

20. The method of claim 17 including directing the jet of air at a location just below the neck of the preform, such that the blow molded article is strengthened in a shoulder region.

* * * * *

UNITED STATES PATENT AND TRADEMARK OFFICE
CERTIFICATE OF CORRECTION

PATENT NO. : 7,550,105 B2  
APPLICATION NO. : 11/063655  
DATED : June 23, 2009  
INVENTOR(S) : Timothy E. Scheid Page 1 of 1

It is certified that error appears in the above-identified patent and that said Letters Patent is hereby corrected as shown below:

Column 7, Claim 10, Line 55:
 "carper" should be --carrier--

Column 8, Claim 14, Line 20:
 "cater" should be --carrier--

Signed and Sealed this

First Day of September, 2009

David J. Kappos
*Director of the United States Patent and Trademark Office*